United States Patent
Leimbach et al.

(10) Patent No.: US 7,453,578 B2
(45) Date of Patent: Nov. 18, 2008

(54) 4PI MICROSCOPE

(75) Inventors: Volker Leimbach, Ludwigshafen (DE); Reiner Rygiel, Altrip (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 142 days.

(21) Appl. No.: 10/573,696

(22) PCT Filed: Sep. 27, 2004

(86) PCT No.: PCT/EP2004/052317
§ 371 (c)(1),
(2), (4) Date: Mar. 27, 2006

(87) PCT Pub. No.: WO2005/033768
PCT Pub. Date: Apr. 14, 2005

(65) Prior Publication Data
US 2007/0052972 A1    Mar. 8, 2007

(30) Foreign Application Priority Data
Sep. 27, 2003    (DE)    ................ 103 44 965

(51) Int. Cl.
*G01B 11/02*    (2006.01)
(52) U.S. Cl. .................... 356/497; 359/385
(58) Field of Classification Search ............ 356/497, 356/479, 503, 512
See application file for complete search history.

(56) References Cited

U.S. PATENT DOCUMENTS

| | | | |
|---|---|---|---|
| 4,790,616 A * | 12/1988 | Frenkel et al. ............ 385/47 |
| 6,570,705 B2 | 5/2003 | Bewersdorf et al. ......... 359/388 |
| 2002/0030886 A1 * | 3/2002 | Bewersdorf et al. ......... 359/387 |
| 2002/0186380 A1 * | 12/2002 | Drake, Jr. ................. 356/502 |
| 2005/0006597 A1 * | 1/2005 | Wolleschensky et al. .. 250/458.1 |
| 2006/0017933 A1 * | 1/2006 | Schluchter et al. .......... 356/493 |
| 2006/0146340 A1 * | 7/2006 | Szwaykowski et al. ...... 356/495 |

FOREIGN PATENT DOCUMENTS

| | | |
|---|---|---|
| DE | 100 46 410 | 3/2002 |
| DE | 100 45 837 | 4/2002 |
| EP | 0 491 289 | 6/1992 |

OTHER PUBLICATIONS

International Search Report for PCT/EP2004/052317 (2 pages).

* cited by examiner

Primary Examiner—Tarifur R Chowdhury
Assistant Examiner—Jonathan M Hansen
(74) Attorney, Agent, or Firm—Darby & Darby

(57) ABSTRACT

A 4Pi microscope provided with an interferometer wherein two lenses (31, 33) are arranged in such a way that they are opposite to each other on different sides of a sample plane (35); also comprising an optical element (19) which is used to inject illuminating light (3) into the interferometer and/or used to discharge detection light (41) from the interferometer and to deflect a detection beam path, containing a reflecting means (51) which reflects illuminating light discharged by the optical element back into the interferometer and/or which allows detection light which is deflected onto the deflection beam to pass, also reflecting other discharged detection light which is not deflected onto the detection beam path into the interferometer.

15 Claims, 1 Drawing Sheet

4PI MICROSCOPE

Figure 1:
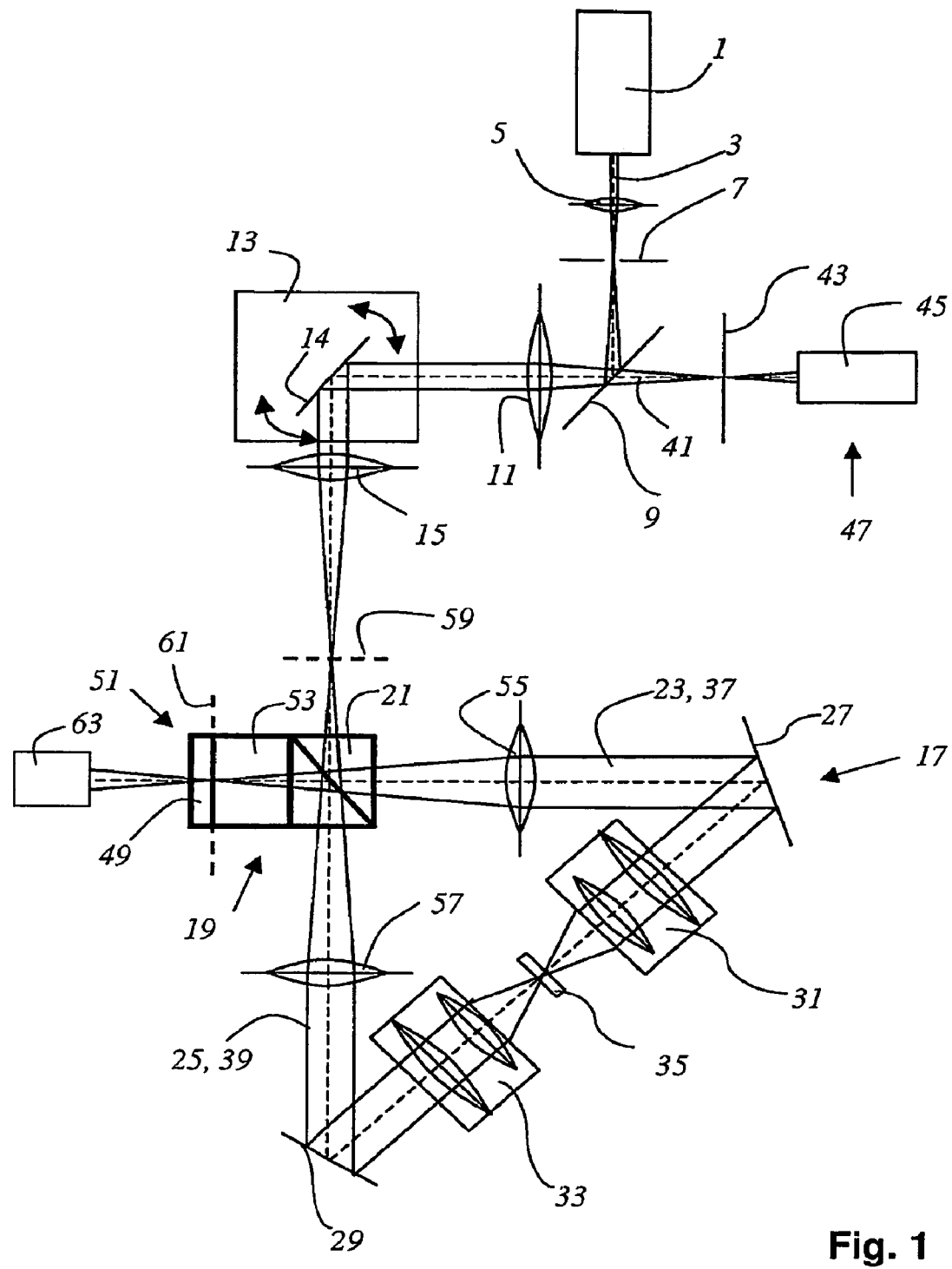

The present invention relates to a 4Pi microscope having an interferometer in which two objectives are positioned to oppose one another on different sides of an object plane, and having an optical element for coupling illuminating light into the interferometer and/or for coupling detected light out of the interferometer and for directing it into a detection beam path.

BACKGROUND

In scanning microscopy, a specimen is illuminated by a light beam in order to observe the reflected light or emitted fluorescent light emanating from the specimen. The focus of an illumination light beam is moved in an object plane using a controllable beam deflection device, generally by tilting two mirrors; the deflection axes usually being perpendicular to one another so that one mirror deflects in the x direction and the other in the y direction. Galvanometer positioning elements are used, for example, for tilting the mirrors. The luminous flux coming from the object is measured as a function of the position of the scanning beam. The positioning elements are typically equipped with sensors in order to determine the active mirror position.

In confocal scanning microscopy, in particular, a specimen is scanned in three dimensions by the focus of a light beam. A confocal scanning microscope generally encompasses a light source, a focusing lens system for focusing the light from the source onto a pinhole (called the "excitation pinhole"), a beam splitter, a beam deflection device used for beam control, a microscope lens system, a detection pinhole, and the detectors for detecting the detected or fluorescent light. The illuminating light is coupled in via the beam splitter. The fluorescent or reflected light coming from the specimen travels back via the beam deflection device to the beam splitter, passing through the same, to then be focused onto the detection pinhole, behind which the detectors are located. Detected light not originating directly from the focus region in the specimen travels a different light path and does not pass through the detection pinhole, so that the only information obtained from the focus region is that which leads to the creation of a three-dimensional image by sequential scanning of the specimen. For the most part, a three-dimensional image is produced by acquiring the image data in layers, the path of the scanning light beam ideally describing a meander on or in the object. To permit the acquisition of image data in layers, once a layer is scanned, the specimen stage or the objective is shifted, thereby bringing the next layer to be scanned into the focal plane of the objective.

An enhanced resolution in the direction of the optical axis is able to be achieved by a double objective arrangement (4Pi arrangement), as described in the European Patent No. EP 0 491 289 entitled "Double-Confocal Scanning Microscope." The light coming from the illuminating system is split into two partial beams which, counterpropagating through two mirror-symmetrically positioned objectives, simultaneously illuminate the specimen. The two objectives are positioned on different sides of their common object plane. This interferometric illumination produces an interference pattern in the object point that, in the context of constructive interference, has a primary maximum and a plurality of secondary maxima. This is referred to as "type A" 4Pi microscopy when there is only interference of the excitation light, "type B" when there is interference of the detected light, and "type C" in the case of simultaneous interference of the excitation light and the detected light. Because of the interferometric illumination, this double-confocal scanning microscope is able to obtain an axial resolution that is enhanced over that of conventional scanning microscopes.

An optical arrangement for illuminating objects, in particular fluorescing objects in a double-confocal scanning microscope, is known from the German Patent Application No. DE 100 46 410 A1. The scanning microscope has a component which unites the two detection beam paths, the light coming from the object being combinable in an at least substantially overlapping fashion in one propagation direction at the component which unites the detection beam path, and means being provided for influencing the phase of the light coming from the object which are positioned at least in one partial beam path of the detection beam path. The uniting component is positioned to permit a substantially lossless combining of the detected light by properly adjusting the phase of the detected light within at least one of the two detection beam paths.

The inherent disadvantage of the known double-confocal scanning microscopes (4Pi microscopes) is that unused excitation light, as well as detected light, are coupled out of the interferometric beam path undesirably and are lost, unused.

SUMMARY OF THE INVENTION

It is, therefore, an object of the present invention to provide a 4Pi microscope having enhanced excitation and/or detection efficiency.

The present invention provides a 4Pi microscope in which a reflecting means is provided that reflects the illuminating light coupled out by the optical element back into the interferometer and/or allows the detected light coupled out by the optical element and directed into the detection beam path to pass through, and another outcoupled detected light portion that is not directed into the detection beam path to be reflected back into the interferometer.

The present invention offers the advantage of less loss of excitation light and of less loss of detected light. Due to the back-reflection of the detected light, fluorescence excitation of other transition lines may advantageously be obtained for many dyes. This leads to an increase in the Stokes shift and to a reduction in the coherence length, thereby reducing the amplitude of the side maxima in the focus region (side lobes), thereby advantageously reducing the outlay required for backfolding. Moreover, the resolving power is also somewhat improved as a result.

In one espeejally preferred embodiment, the reflecting means has color-selective reflecting properties. In this embodiment, a different reflection factor, or reflectance, may be provided for light of the wavelength of the excitation light and for light of the wavelength of the detected light.

A delay element for compensating for phase jumps is preferably provided between the optical element and the reflecting means. In one preferred variant, the optical element, the reflecting means and the delay element are cemented together to form an optical unit. As a delay element, a drift section may also be provided, which is settable by piezo adjustment, for example.

In one preferred embodiment, the reflecting means has color-selective reflecting properties. In this embodiment, a different reflection factor, or reflectance, may be provided for light of the wavelength of the excitation light and for light of the wavelength of the detected light.

The reflecting means preferably includes a mirror, which in one special variant is convex, to optimally allow for the optical beam path properties of the interferometer.

One conceivable embodiment also provides for combining the features of a convex shape and color-selective reflecting properties in one mirror.

In another preferred variant, the reflecting means is designed to be semireflecting. To monitor the adjustment, this variant provides for a camera to be used, which receives the illuminating and/or detected light passing through the reflecting means. The 4Pi microscope is preferably designed in such a way that one real intermediate image is present near the optical element that is observable by the camera. To prevent excitation light emerging from the interferometer from being fed back to the light source producing the illuminating light, in one preferred variant, an optical diode, which preferably includes a Faraday rotator, is provided between the light source and the optical element.

BIEF DESCRIPTION OF THE DRAWING

The present invention is elaborated upon below based on an exemplary embodiment with reference to the drawing.

FIG. 1 shows a confocal 4Pi microscope according to the present invention.

DETAILED DESCRIPTION

FIG. 1 illustrates a confocal 4Pi microscope according to the present invention, including a light source 1 which produces an illumination light beam 3. Illumination light beam 3 is focused with the aid of a lens system 5 at illumination pinhole 7, passes through the same, and arrives at main beam splitter 9. Main beam splitter 9 reflects illumination light beam 3 through further lens system 11 for beam deflection device 13, which contains a gimbal-mounted scanning mirror 14. Illumination light beam 3 passes through scanning lens system 15 and is coupled into interferometer 17. For incoupling optics, interferometer 17 includes an optical element 19, designed as beamsplitter cube 21. Beamsplitter cube 21 divides illumination light beam 3 into a first illumination-light partial beam 23 and a second illumination-light partial beam 25, which are directed by path-folding mirrors 27 and 29, respectively, and through microscope objectives 31 and 33, respectively, to specimen 35. The detected light emanating from the specimen passes through the two microscope objectives 31 and 33, and via path-folding mirrors 27 and 29 back to optical element 19, which unites the two detection-light partial beams 37 and 39 and couples out a detection-light composite beam 41, directing it to a detection beam path extending along beam deflection device 13. At the end of the detection beam path, after passing through main beam splitter 9 and after passing through detection pinhole 43, detection-light composite beam 41 reaches a detector 47 designed as multiband detector 45. The detected light coupled out by optical element 19 and not directed into the detection beam path is reflected with the aid of reflecting means 51 designed as mirror 49 back into the interferometer. Between optical element 19 and reflecting means 51 is a delay element designed as plane-parallel plate 53 for compensating for phase jumps. The delay element, optical element 19, and reflecting means 51 are cemented together to form an optical unit. Provided in each of the two partial beam paths of interferometer 17 is one lens system 55, 57, respectively, which focuses the detected light emanating from specimen 35 to create an intermediate image 59 in the detection beam path. Lens systems 55, 57 also focus the outcoupled detected light that is not directed into the detection beam path, to create an additional intermediate image 61. Reflecting means 51 is positioned precisely at the location of the additional intermediate image 61. The light passing to a minor degree through the reflecting means is received by a camera 63, the camera signal being used to monitor the adjustment of interferometer 17.

The invention has been described with reference to one particular embodiment. Changes and modifications can, of course, be made without departing from the scope of protection of the claims presented below.

LIST OF REFERENCE NUMBERS 1 light source
3 illumination light beam
5 lens system
7 illumination pinhole
9 main beam splitter
11 additional lens system
13 beam deflection device
14 scanning mirror
15 scanning lens system
17 interferometer
19 optical element
21 beamsplitter cube
23 first illumination-light partial beam
25 second illumination-light partial beam
27 path-folding mirror
29 path-folding mirror
31 microscope objective
33 microscope objective
35 specimen
37 detection-light partial beam
39 detection-light partial beam
41 detection-light composite beam
43 detection pinhole
45 multiband detector
47 detector
49 mirror
51 reflecting means
53 plane-parallel plate
55 lens system
57 lens system
59 intermediate image
61 additional intermediate image
63 camera

What is claimed is:

1. A 4Pi microscope comprising:
   an interferometer in which two objectives are positioned to oppose one another on different sides of an object plane, and having an optical element for coupling illuminating light into the interferometer and for coupling detected light out of the interferometer and for directing it into a detection beam path, a detected light portion being coupled out by the optical element and not directed into the detection beam path;
   a reflecting device configured to reflect illuminating light coupled out by the optical element back into the interferometer and to reflect the detected light portion coupled out by the optical element that is not directed into the detection beam path back into the interferometer; and
   a delay element configured to compensate for phase jumps, the delay element arranged between the optical element and the reflecting device.

2. The 4Pi microscope as recited in claim 1, wherein the optical element includes at least one beam splitter.

3. The 4Pi microscope as recited in claim 2, wherein the beam splitter is a beamsplitter cube.

4. The 4Pi microscope as recited in claim 2, wherein the reflecting device is positioned directly at the beam splitter.

5. The 4Pi microscope as recited in claim 2, wherein the reflecting device includes an at least partially reflective coating.

6. The 4Pi microscope as recited in claim 2, wherein the reflecting device is vapor-deposited onto the beam splitter.

7. The 4Pi microscope as recited in claim 1, wherein the reflecting device has color-selective reflecting properties.

8. The 4Pi microscope as recited in claim 1, wherein the reflecting device includes a mirror.

9. The 4Pi microscope as recited in claim 8, wherein the mirror is convex.

10. The 4Pi microscope as recited in claim 1, wherein the optical element, the reflecting device and the delay element form a single unit.

11. The 4Pi microscope as recited in claim 1, wherein the optical element, the reflecting device and the delay element are cemented together to form a single unit.

12. The 4Pi microscope as recited in claim 1, wherein the reflecting device is semireflecting.

13. The 4Pi microscope as recited in claim 12, further comprising a camera configured to monitor an adjustment, the camera configured to receive at least one of illuminating and detected light passing through the reflecting device.

14. The 4Pi microscope as recited in claim 1, further comprising:
   a light source configured to produce the illuminating light; and
   an optical diode disposed between the light source and the optical element.

15. The 4Pi microscope as recited in claim 14, wherein the optical diode includes a Faraday rotator.

* * * * *